(12) United States Patent
Dell et al.

(10) Patent No.: US 12,729,809 B2
(45) Date of Patent: Sep. 8, 2026

(54) DECK CLIP AND METHOD OF ATTACHING ACCESSORIES TO STAGE SYSTEMS

(71) Applicant: TAIT TOWERS MANUFACTURING, LLC, Lititz, PA (US)

(72) Inventors: Douglas Lawrence Dell, Lancaster, PA (US); Robert M. Homan, IV, York, PA (US); Austin Lee Ulmer, Lancaster, PA (US)

(73) Assignee: TAIT GLOBAL, LLC, Lititz, PA (US)

( * ) Notice: Subject to any disclaimer, the term of this patent is extended or adjusted under 35 U.S.C. 154(b) by 86 days.

(21) Appl. No.: 18/738,831

(22) Filed: Jun. 10, 2024

(65) Prior Publication Data

US 2025/0109823 A1 Apr. 3, 2025

Related U.S. Application Data

(60) Provisional application No. 63/586,432, filed on Sep. 29, 2023.

(51) Int. Cl.

*F16M 13/02* (2006.01)
*A63J 1/02* (2006.01)
*A63J 5/02* (2006.01)
*E04H 3/24* (2006.01)

(52) U.S. Cl.

CPC .............. *F16M 13/022* (2013.01); *A63J 1/02* (2013.01); *A63J 5/02* (2013.01); *E04H 3/24* (2013.01)

(58) Field of Classification Search

CPC .. F16B 2/24; F16B 5/06; F16M 13/00; F16M 13/02; F16M 13/022; F16M 11/00; E04B 9/00

See application file for complete search history.

(56) References Cited

U.S. PATENT DOCUMENTS 3,528,050 A * 9/1970 Hindenburg ............. H01R 4/64 439/535
3,612,461 A * 10/1971 Brown ...................... E04B 9/18 52/506.07
6,027,091 A * 2/2000 Johnson .................. E04B 9/006 52/39
6,484,365 B1 * 11/2002 Thompson ............. B60J 3/0204 24/3.12
6,622,410 B2 * 9/2003 Wilkes .................... G09F 3/204 40/649

(Continued)

*Primary Examiner* — Monica E Millner
(74) *Attorney, Agent, or Firm* — Saxton & Stump, LLC

(57) ABSTRACT

A method, deck clip and stage system for attaching accessories to a platform member. A platform member having an edge rail having a first channel along a first surface of the edge rail and a second channel along a second surface is provided. A deck clip is provided having a profile including a first protrusion extending from a first portion of the deck clip and a second protrusion extending from a second portion of the deck clip. A spring feature is disposed between the first portion and second portion. The spring feature is arranged and disposed to provide a clipping force between the first protrusion and the first channel and the second protrusion and the second channel when engaged. The first protrusion is directed into the first channel and the second protrusion is directed into the second channel to detachably engage the deck clip to the platform member.

19 Claims, 7 Drawing Sheets

(56) References Cited

U.S. PATENT DOCUMENTS

| | | | | |
|---|---|---|---|---|
| 7,065,912 | B2 * | 6/2006 | Pitcher | G09F 3/20<br>248/231.61 |
| 8,136,460 | B2 | 3/2012 | Tait et al. | |
| 8,205,844 | B1 * | 6/2012 | Erickson | A47B 96/067<br>40/658 |
| 8,245,462 | B2 * | 8/2012 | Miethe | E06B 1/02<br>52/204.7 |
| 9,548,598 | B2 * | 1/2017 | Tally | H02G 3/32 |
| 9,689,171 | B1 * | 6/2017 | Cartwright | E04H 3/28 |
| 10,847,960 | B1 * | 11/2020 | Naugler | H02G 3/32 |
| 11,406,210 | B2 * | 8/2022 | Marshall | F16B 5/121 |
| 2010/0101131 | A1 * | 4/2010 | Lipczynski | E06B 7/28<br>40/745 |
| 2010/0192334 | A1 * | 8/2010 | Reichle | B60M 5/02<br>24/457 |
| 2016/0264030 | A1 * | 9/2016 | Saiga | A47C 31/023 |

* cited by examiner 103
107
301
801

103
107
301
701

103
107
301
601

DECK CLIP AND METHOD OF ATTACHING ACCESSORIES TO STAGE SYSTEMS

CROSS REFERENCE TO RELATED APPLICATIONS

This application is a non-provisional patent application claiming priority and benefit of U.S. Provisional Patent Application No. 63/586,432, filed Sep. 29, 2023, entitled "Accessory Deck Clip", which is hereby incorporated by reference in its entirety.

FIELD OF THE INVENTION

The present disclosure is generally directed to a clip and method for attaching accessories to components of stage systems.

BACKGROUND OF THE INVENTION

Known mounting methods for mounting accessories to platform members include mounting accessories, such as softgoods or light emitting diode (LED) edging, to platform members by drilling and adding nipple medallions to the surface of the deck. The drilling and adding of nipple medallions, in turn, damage the surface of the deck for future use as well as limiting adjustment if placement is incorrect.

Other methods for attachment include utilization of hook and loop fasteners (e.g., Velcro® strips) to attach accessories. However, utilization of these types of fasteners result in residual adhesive from the attachment of these fasteners to the platform member components. For example, for every 8' span of extrusion, it may take personnel 15 minutes or more to remove adhesive from a typical platform member arrangement at a significant and undesirable labor cost.

What is needed is an attachment system for decks that does not suffer from the drawbacks of the prior art. Other features and advantages will be made apparent from the present specification. The teachings disclosed extend to those embodiments that fall within the scope of the claims, regardless of whether they accomplish one or more of the aforementioned needs.

SUMMARY OF THE INVENTION

One embodiment of the present disclosure includes a method for attaching accessories to a platform member. The method includes providing a platform member having an edge rail having a first channel along a first surface of the edge rail and a second channel along a second surface of the edge rail. A deck clip is provided having a profile including a first protrusion extending from a first portion of the deck clip and a second protrusion extending from a second portion of the deck clip. A spring feature is disposed between the first portion and second portion. The first protrusion is arranged and disposed to mate with the first channel of the edge rail and the second protrusion being arranged and disposed to mate with the second channel of the edge rail. The spring feature is arranged and disposed to provide a clipping force between the first protrusion and the first channel and the second protrusion and the second channel when engaged. The first protrusion is directed into the first channel and the second protrusion is directed into the second channel to detachably engage the deck clip to the platform member.

Another embodiment of the present disclosure includes a deck clip. The deck clip includes a profile including a first protrusion extending from a first portion of the deck clip and a second protrusion extending from a second portion of the deck clip. A spring feature is disposed between the first portion and second portion. The first protrusion is arranged and disposed to mate with a first channel of an edge rail of a staging deck and the second protrusion is arranged and disposed to mate with a second channel of the edge rail of the staging deck. The spring feature is arranged and disposed to provide a clipping force between the first protrusion and the first channel and the second protrusion and the second channel when engaged.

Another embodiment of the present disclosure includes stage system. The stage system includes a platform member including an edge rail having a first channel along a first surface of the edge rail and a second channel along a second surface of the edge rail. The stage system also includes a deck clip having a profile including a first protrusion extending from a first portion of the deck clip and a second protrusion extending from a second portion of the deck clip. A spring feature is disposed between the first portion and second portion. The first protrusion is arranged and disposed to mate with the first channel and the second protrusion is arranged and disposed to mate with the second channel. The spring feature is arranged and disposed to provide a clipping force between the first protrusion and the first channel and the second protrusion and the second channel when engaged.

Other features and advantages of the present invention will be apparent from the following more detailed description of the preferred embodiment, taken in conjunction with the accompanying drawings which illustrate, by way of example, the principles of the invention.

BRIEF DESCRIPTION OF DRAWINGS

Wherever possible, the same reference numbers will be used throughout the drawings to represent the same parts.

DETAILED DESCRIPTION OF THE INVENTION

Embodiments of the present disclosure include deck clips, platform members, stage systems, methods for attaching accessories to platform members and methods for assembling stage systems that reduce install and strike time of accessories for stage systems, such as fascia and edge lighting. Deck clips according to the present disclosure reduce the amount of refurbishment work on platform members and stage systems that includes accessories, such as soft goods, because the deck clips according to the present disclosure eliminates the step of removing adhesive left behind from Velcro. The deck clip, in one embodiment, is formed of a flexible plastic material that allows tool-less mounting of accessories, such as softgoods, hard panel fascia, LED edge lighting and moving light brackets, to the edge rails of platform members to provide additional an aesthetic or function to the stage system. The deck clip has a configuration that allows manual manipulation from an installer to engage the deck clip on the platform member and disengage the deck clip from the platform member easily.

Figure 1:
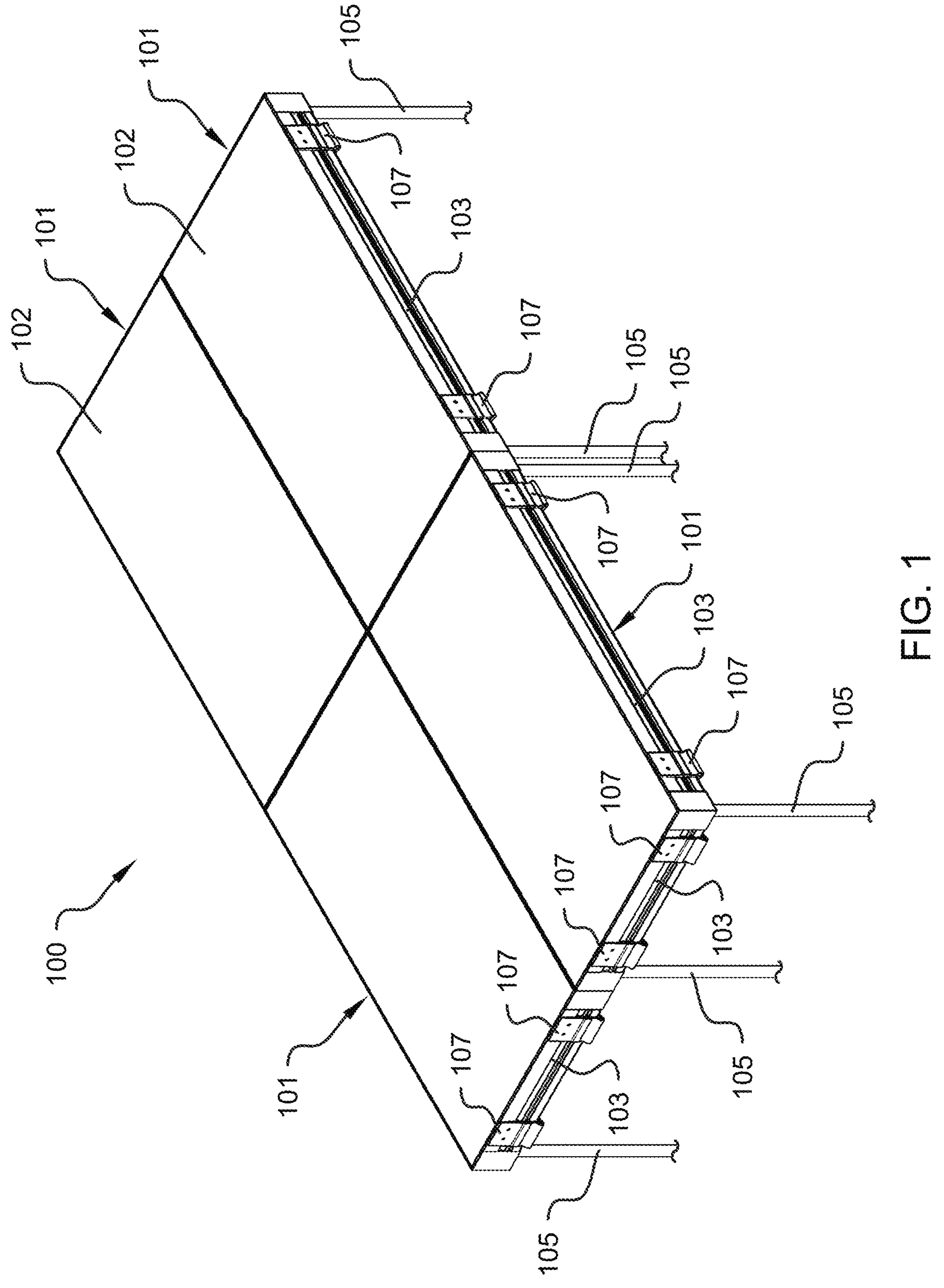
FIG. 1 shows a perspective view of a stage system having engaged deck clips according to an embodiment of the present invention.

FIG. 1 shows a stage system 100 having a plurality of platform members 101 forming a continuous surface. The continuous service may include panels 102, which may be solid as shown in FIG. 1, or may having, for example, transparent or translucent material, openings, indicia, designs or functional features, such as lighting or video elements. Platform members 101 may attach to each other by any suitable means including, but not limited to, latches, fasteners or other attachment devices that may be disassembled for storage or transportation. The platform members 101 includes edge rails 103 along a periphery of each of the platform members 101. The platform members 101 are attached to each other along the edge rails 103. Although platform members 101 are shown with a rectangular geometry, the present invention is not limited to a rectangular geometry. The platform member 101 may be fabricated into any geometry that provides the desired support for the portable support structure 100 and is easily stored and/or transported. The stage system 100 may be disassembled into individual platform members 101, which preferably have a size and geometry suitable for storage and/or transportation. The individual platform members 101 include associated primary support members 105. The primary support member 105 is preferably a leg, column, tube, cylinder or other elongated structure provided at a substantially perpendicular angle to the platform member 101 capable of bearing a load from the platform member 101. The stage system 100 may also include secondary supports (not shown) that may provide additional load capacity, stability and resistance to lateral forces. The portable support structure 100 includes platform members 101, primary support members 105 and, optionally secondary support members, detachably engaged to provide structural support for the platform member 101. Although not shown, a rotatable wheel or caster may be included at one end of the primary support member 105 in order to provide the stage system 100 with added mobility. In other embodiments, the primary support member 105 may include a structure for contacting a foundation surface, including, but not limited to, a fixed wheel, a skid, footing or other structure suitable for providing support and transferring and distributing the load provided by the portable support structure 100. Suitable stage systems 100 may include stage systems 100 shown and described in U.S. Pat. No. 8,136,460, entitled "PORTABLE LOCKING SUPPORT AND PLATFORM SYSTEM", to Tait et al., which is incorporated by reference in its entirety.

Figure 2:
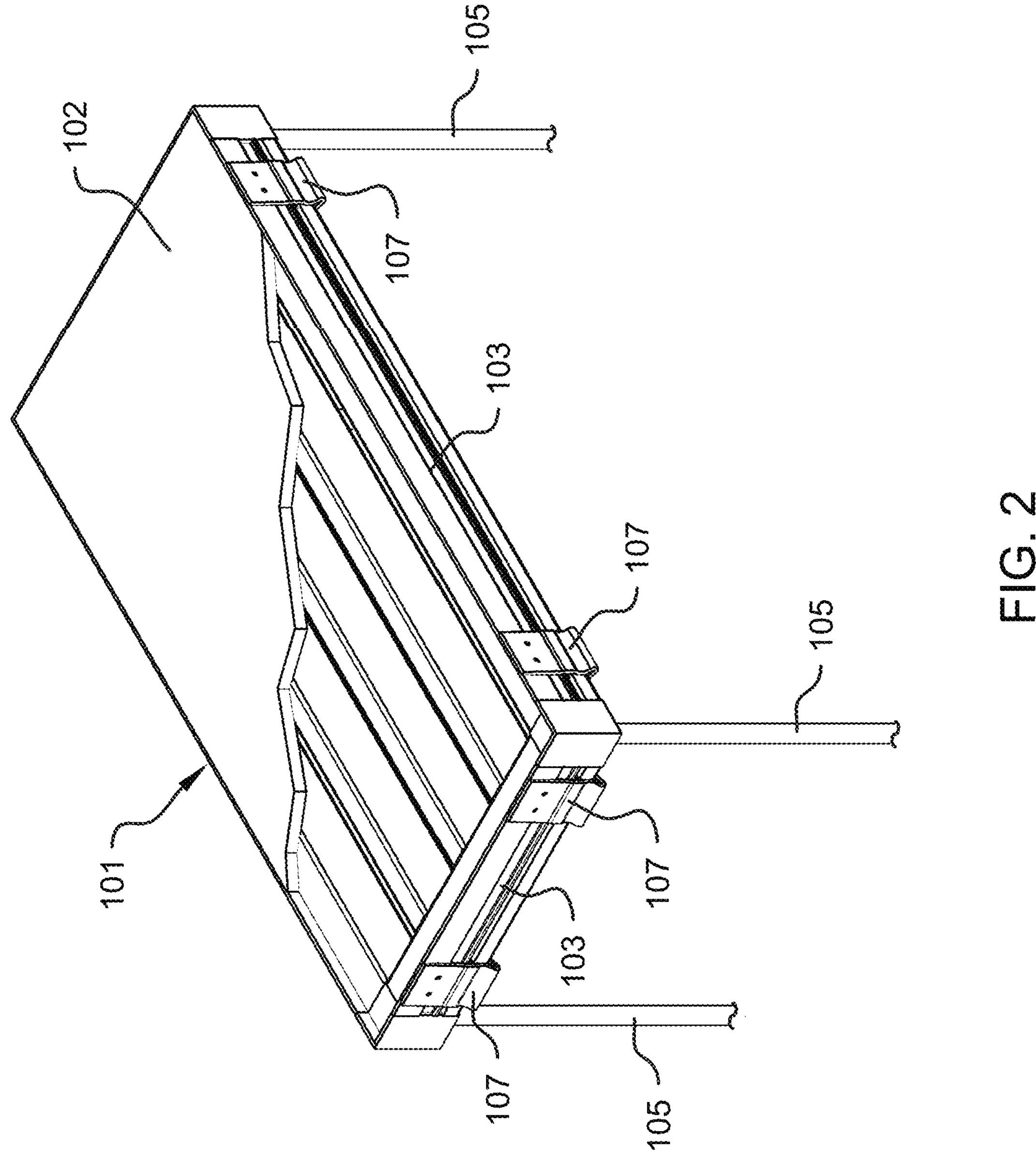
FIG. 2 shows a perspective view of a platform member having engaged deck clips according to an embodiment of the present invention.

FIG. 1 further includes a deck clip 107 according to the present disclosure detachably engaged to edge rail 103 of platform member 101. As used herein, "detachably engaged" or the like refers to the ability to connect and disconnect deck clips 107 from edge rail 103 with minor manual manipulation from an installer. For example, detachably engaged deck clips 107 may be engaged and disengaged without the assistance of tools. Installer, as utilized herein, includes any person involved in the assembling, disassembling, servicing or otherwise interacting with the stage system 100. As shown in greater detail in FIG. 5, the deck clip 107 includes a first protrusion 401 that is inserted into and engages a first channel 501 of the edge rail 103. In addition, a second protrusion 405 is inserted into and engages a second channel 503 of the edge rail 103. FIG. 2 shows a platform member 101 having a panel 102 partially cutaway, having deck clips 107 engaged to the edge rail 103 of the platform member 101. Although FIGS. 1 and 2 show deck clips 107 with no accessories 301 attached, embodiments of the present disclosure may include accessories 301, which provide either aesthetic or functional features to the stage system 100, see FIGS. 3 and 6-10.

Figure 3:
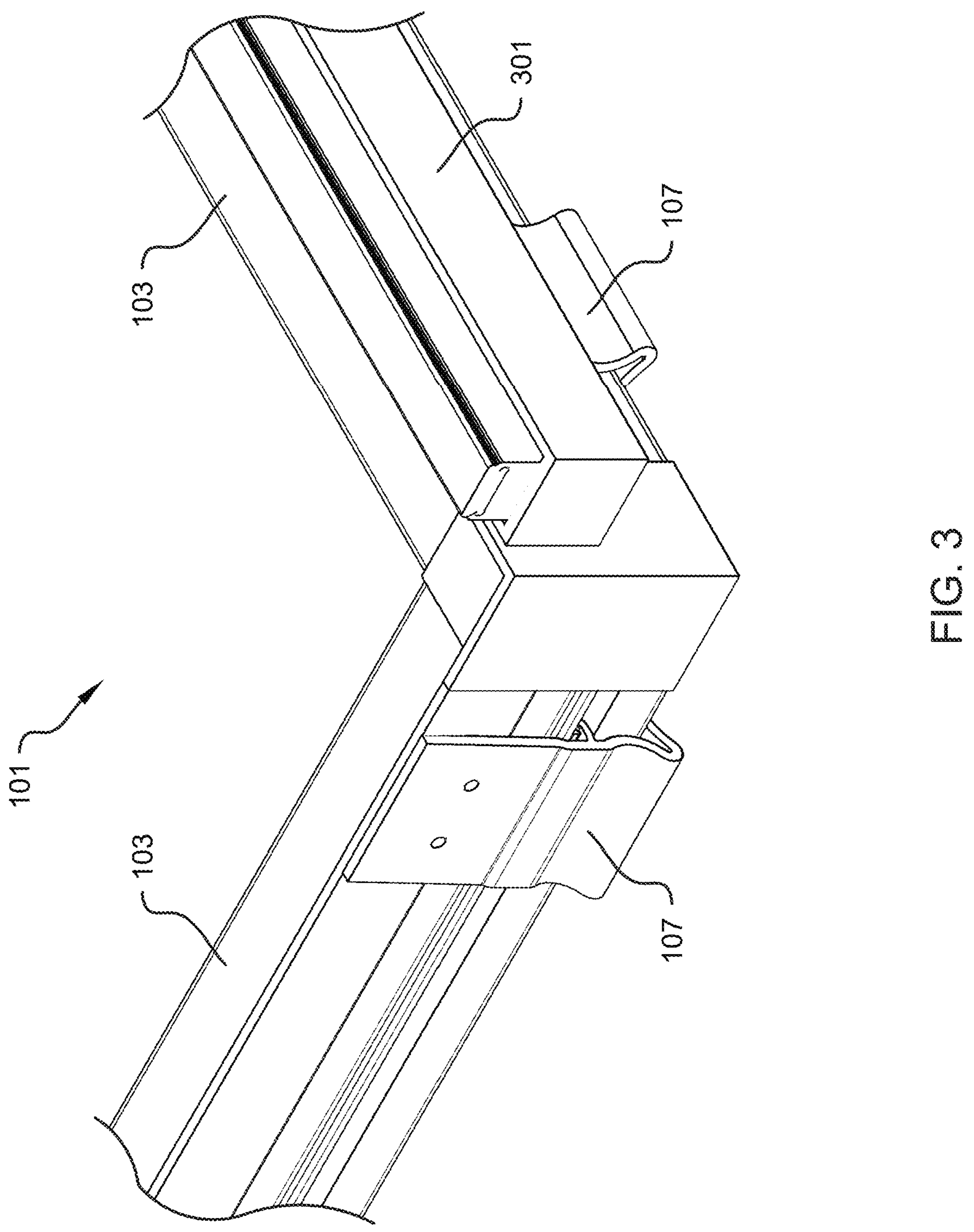
FIG. 3 shows an expanded view a portion of a platform member having engaged deck clips according to an embodiment of the present invention.

FIG. 3 shows an expanded view a portion of a platform member 101 having panel 102 removed with engaged deck clips 107 according to an embodiment of the present invention including an attached accessory 301. As shown in FIG. 3, deck clips 107 may be attached or otherwise engaged to an accessory 301 that provides, for example, an aesthetic or functional feature to the platform member 101 or stage system 100. In this embodiment accessory 301 is a light emitting diode structure that may be manually removed from the edge rail 103 and the platform member 101 by disengagement of deck clip 107.

Figures 4, 5:
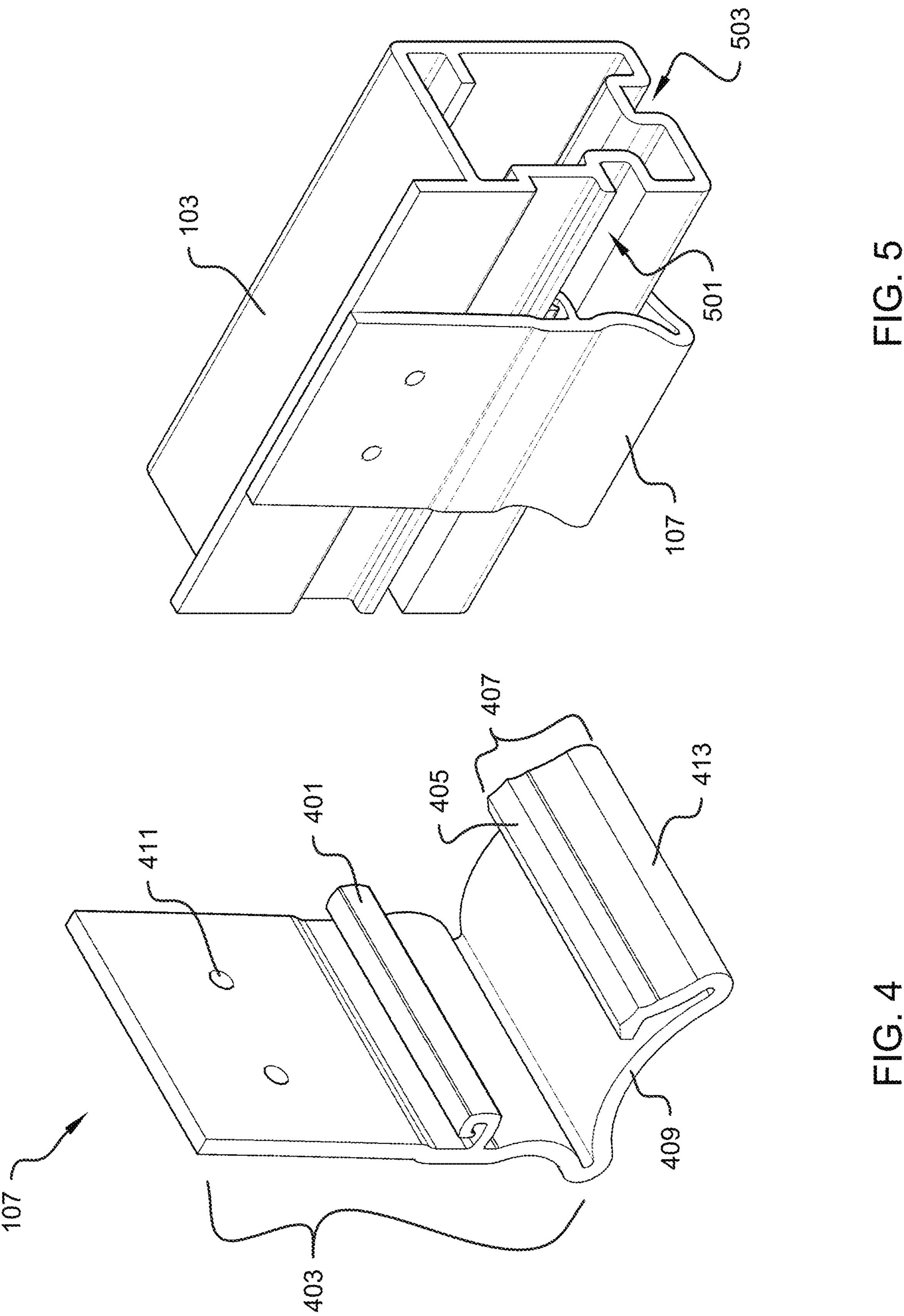
FIG. 4 shows a perspective view of a deck clip according to an embodiment of the present invention.
FIG. 5 shows a perspective view of a deck clip engaged to an edge rail according to an embodiment of the present invention.

FIG. 4 shows a perspective view of a deck clip 107 according to an embodiment of the present disclosure. Deck clip 107 includes a profile including a first protrusion 401 extending from a first portion 403 of the deck clip 107 and a second protrusion 405 extending from a second portion 407 of the deck clip 107. Profile, as utilized herein, includes a cross-sectional geometry of the deck clip 107. The geometry of the first protrusion 401 is not limited to the geometry shown in FIG. 4 and may include other protrusion geometries that are capable of entering and engaging one or more surfaces of first channel 501 (see, for example, FIG. 5). The geometry of the second protrusion 405 is not limited to the geometry shown in FIG. 4 and may include other protrusion geometries that are capable of entering and engaging one or more surfaces of second channel 503 (see, for example, FIG. 5). In addition, deck clip 107 also includes a spring feature 409 disposed between the first portion 403 and the second portion 407. In one embodiment, as shown in FIG. 4, the spring feature 409 may include an arcuate geometry that both provides a flexing or spring-like force to the first protrusion 401 and the second protrusion 405. Deck clip 107 further includes attachment features 411 for attachment of accessories 301. As shown in FIG. 4, the attachment features 411 may be openings allowing passage of fasteners or other similar structures to attach the accessory 301 to the deck clip 107. While deck clip 107 is shown with attachment features 411, such features are not required and any suitable attachment technique may be utilized for the attachment of the deck clip 107 to accessory 301. For example, the attachment may be provided by techniques, including, but not limited to, welding, adhesive, fasteners, interlocking or any other attachment that provide sufficient attachment between the deck clip 107 and accessory 301. In addition, deck clip 107 includes release feature 413 along second portion 407. The release feature 413 is a surface, protrusion or other feature having a geometry permitting application of a manual force, such as from the fingers of an installer, sufficient to disengage second protrusion 405 from second channel 503 (see for example FIG. 12).

FIG. 5 shows a perspective view of a portion of an edge rail 103 having a deck clip 107 engaged thereto. Edge rails 103 according to the present disclosure may be any suitable structure having a first channel 501 and a second channel 505 positioned along surfaces that permit the clipping engagement of the deck clip 107. As shown in FIG. 5, the surface upon which the first channel 501 and the second channel 505 are arranged are at right angles to one another. However, the disclosure is not so limited and other arrangements of surfaces, including surfaces at other angles or along co-linear surfaces, provided that the first channel 501 and the second channel 503 are capable of engaging the first protrusion 401 and the second protrusion 405 in manner that provides the clipping arrangement formed from deck clip 107. While not so limited, edge rails 103 may be extruded metal or polymer. While not so limited, in one embodiment, the edge rail 103 may be fabricated from extruded aluminum. Likewise, the geometry and proportions of the edge rail 103 are not limited to the configuration shown in FIG. 5. For example, in additional to linear arrangements, the geometry of the edge rails may be rounded, curved or otherwise shaped, provided that they have a first channel 501 and a second channel 503. The first protrusion 401 of deck clip 107 is positioned and has a geometry that permits insertion into and engagement with first channel 501 of edge rail 103. The second protrusion 405 is positioned and has a geometry that permits insertion into and engagement with a second channel 503 of the edge rail 103. The spring feature 409 is fabricated from a resilient material that permits a spring-like force providing action capable of providing a clipping action between the first protrusion 401 and the second protrusion 403. The embodiment shown in FIGS. 4 and 5 include a spring feature 409. The configuration and geometry of the spring feature 409 allows a loading of the spring feature 409 while the second protrusion 405 is being directed into the second channel 503. For example, in one embodiment, during installation of deck clip 107, an installer may direct the first protrusion 401 into the first channel 501 and then direct the second protrusion 405 along a surface of the edge rail 103 toward the second channel 502, loading the spring feature 409 with a spring force or clipping force, until the second protrusion 405 is inserted into and engaged with the second channel 503. During the engagement of the second protrusion 405 with the second channel 503, the spring feature 409 may deflect back toward an unloaded state creating a clipping or snapping into engagement. Suitable materials for fabricating the deck clip 107 include resilient and flexible materials including metal or polymer materials. For example, the deck clip 107 may be fabricated from thermoplastic material, such as chlorinated polyvinyl chloride (CPVC). In other embodiments, the deck clip 107 may be fabricated from nylon.

While FIGS. 1-3 show the edge rail 103 being used with a stage system 100 and a platform member 101, the disclosure is not so limited and edge rail 103 may be any structure or associated with any structure requiring detachable engagement, for example of accessories 301.

Figures 6, 7, 8:
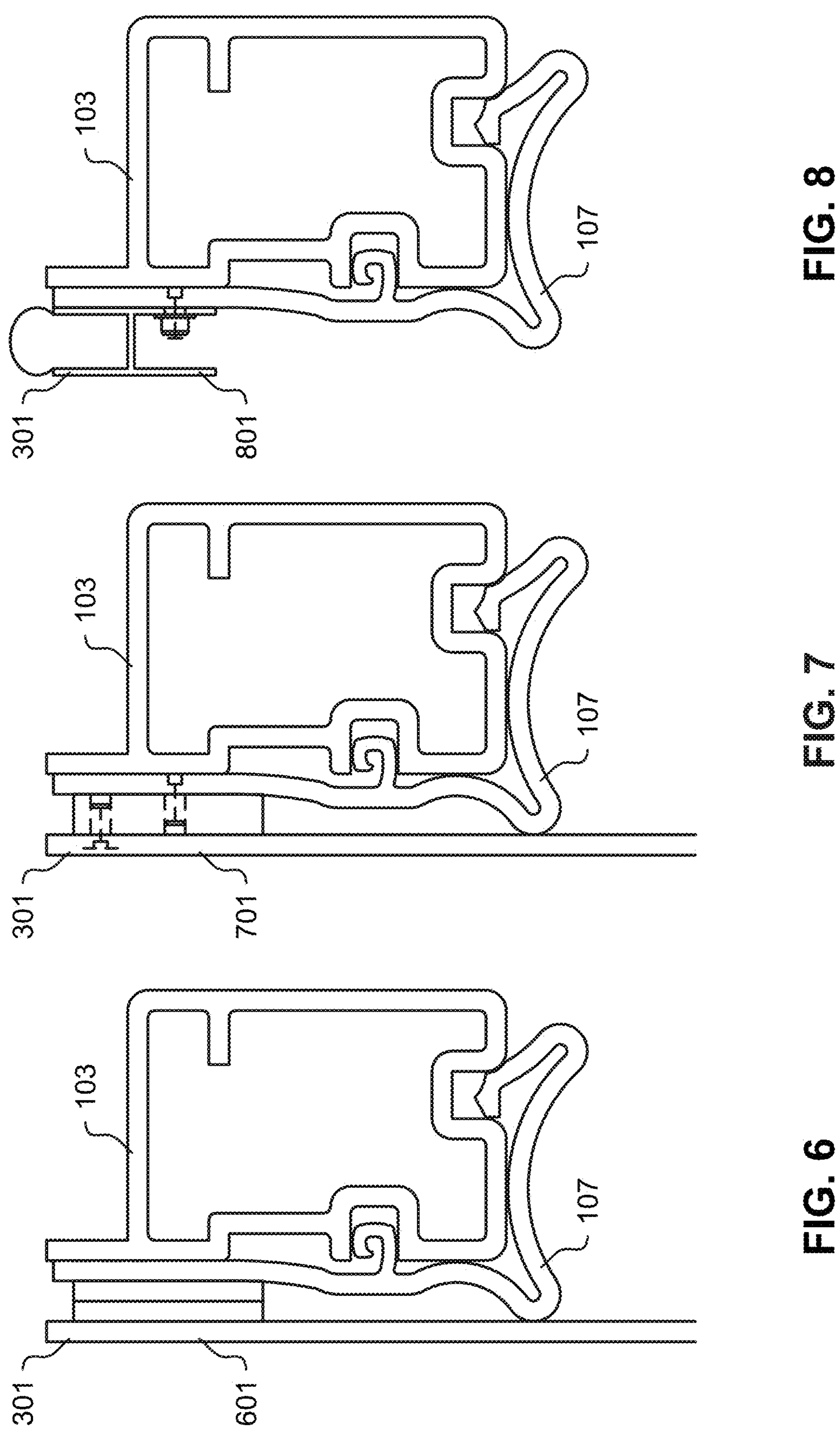
FIG. 6 shows a cutaway view of a deck clip engaged to an edge rail having an attached accessory according to an embodiment of the present invention.
FIG. 7 shows a cutaway view of a deck clip engaged to an edge rail having an attached accessory according to another embodiment of the present invention.
FIG. 8 shows a cutaway view of a deck clip engaged to an edge rail having an attached accessory according to another embodiment of the present invention.
Figure 10:
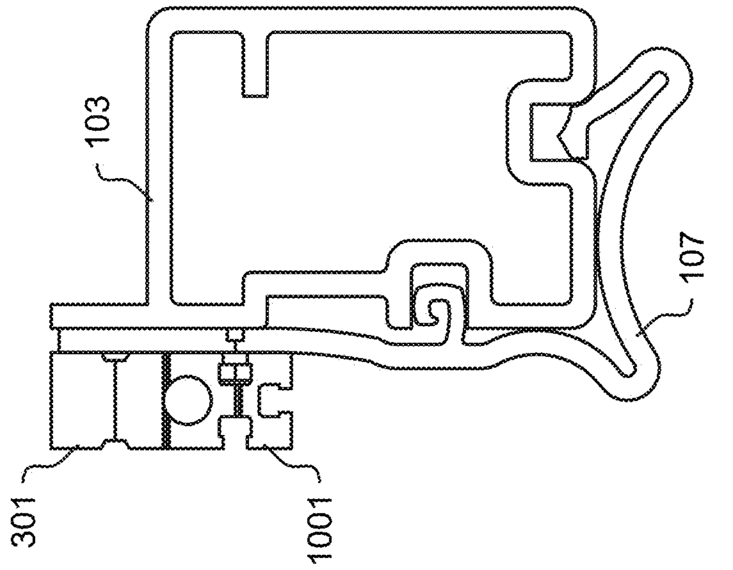
FIG. 10 shows a cutaway view of a deck clip engaged to an edge rail having an attached accessory according to another embodiment of the present invention.
Figure 9:
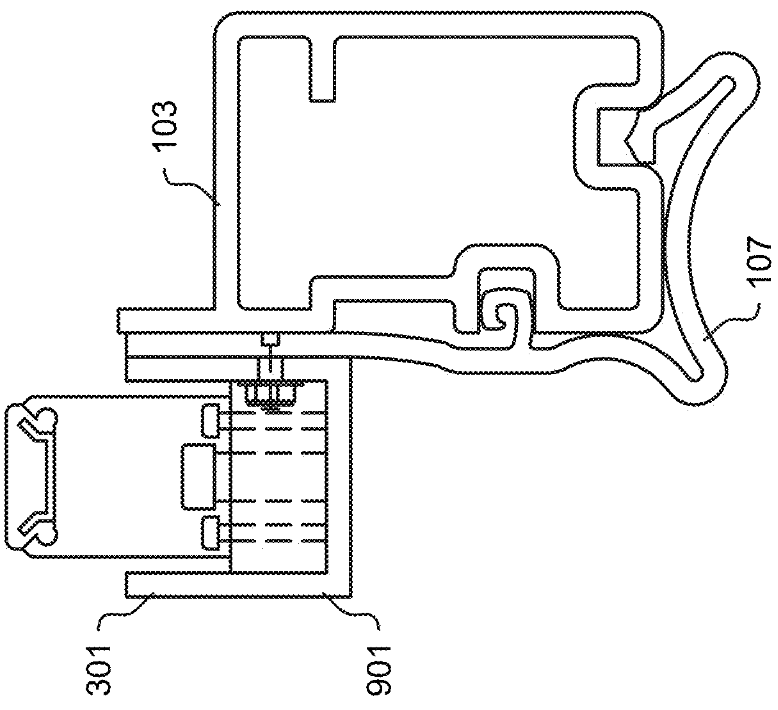
FIG. 9 shows a cutaway view of a deck clip engaged to an edge rail having an attached accessory according to another embodiment of the present invention.

FIGS. 6-10 show various embodiment of deck clips 107 engaged with edge rails 103 having various examples of accessories 301 attached to deck clips 107. FIG. 6 includes a deck clip 107 having an accessory 301 including softgoods 601. Softgoods 601 may include any fabric-based materials used in the production, staging, or decoration of a performance or event in association with stage system 100. For example, this may include curtains, drapes, backdrops, flags, scrims, and any other textiles or fabric structures utilized to enhance the visual appeal of a production or to create specific atmospheres. Softgoods 601 may be attached to the deck clip utilizing any suitable technique including fasteners, adhesive or compressive connections. FIG. 7 includes a deck clip 107 having an accessory 301 including fascia 701. Fascia 701 may include, for example, screens for panels, such as KYDEX® polymeric panels. Fascia may also include screens, such as video screens that may be used as a backdrop or visual display during a performance or event. Fascia 701 may be attached to the deck clip utilizing any suitable technique including fasteners, adhesive or compressive connections. FIGS. 8, 9 and 10 include light emitting diode (LED) lighting effects. For example, FIG. 8 includes a deck clip 107 having an accessory 301 including LED edging 801. FIG. 9 includes a deck clip 107 having an accessory 301 including LED linear video batten 901. FIG. 10 includes a deck clip 107 having an accessory 301 including LED linear beam lighting 1001. LED edging 801, LED linear video batten 901 and LED linear beam lighting 1001 each include different arrangements of lighting effects and/or video formed from LED elements. LED edging 801, LED linear video batten 901 and LED linear beam lighting 1001 may be attached to the deck clip utilizing any suitable technique including fasteners, adhesive or compressive connections. In addition, in other embodiments, accessories 301 may include, for example, scenic detailing, such as, at the perimeter of a stage; and communication components, such as antennae, receivers (e.g., receivers for laser guided equipment) or other similar devices, suitable for communication and/or navigation of stage components or personnel.

Figures 11, 12:
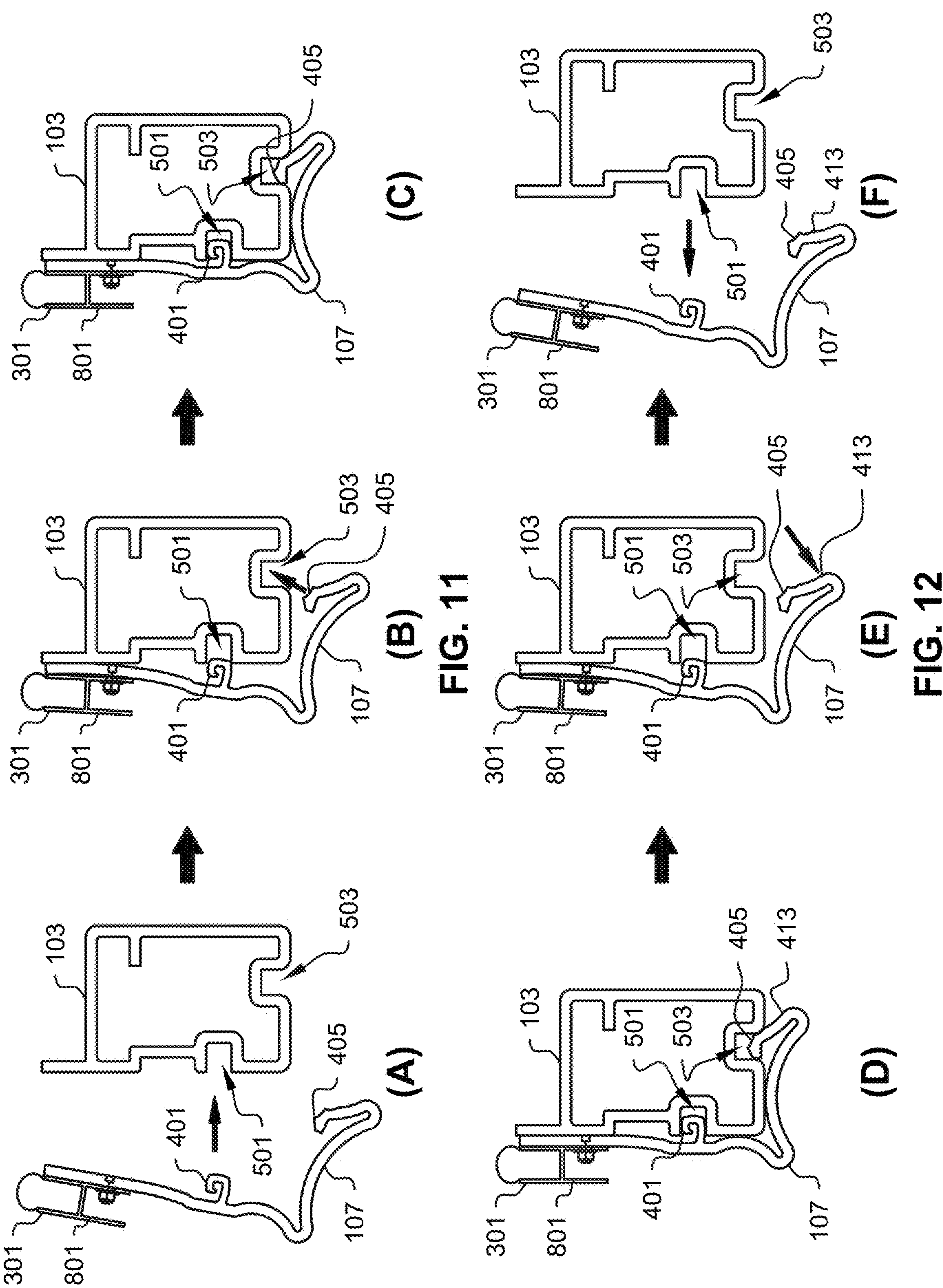
FIG. 11 illustrates a method of engaging a deck clip to an edge rail according to another embodiment of the present invention.
FIG. 12 illustrates a method of engaging a deck clip to an edge rail according to another embodiment of the present invention.

FIG. 11 illustrates a method of engaging the deck clip 107 to the edge rail 103. As illustrated in FIG. 11, deck clip 107 is utilized to attach an accessory 301 to an edge rail 103. To engage the deck clip 107, an installer first directs the first protrusion 401 of the deck clip 107 into the first channel 501 of edge rail 103 (Step (A)). Thereafter, the second protrusion 405 of the deck clip 107 is directed into the second channel 503 of the edge rail 103 (Step (B)). This directing into the second channel 503 may include directing the second protrusion along a surface, whether in contact or not, of the edge rail 103 toward the second channel 502. This directing step loads the spring feature 409 with a spring force or clipping force until the second protrusion 405 is inserted into and engaged with the second channel 503. During the engagement of the second protrusion 405 with the second channel 503, the spring feature 409 may deflect back toward an unloaded state creating a clipping or snapping into engagement. Upon engagement, the first protrusion 401 is positioned within and engaged with the first channel 501 and the second protrusion 405 is positioned within and engaged with the second channel 503 (Step (C)).

FIG. 12 illustrates a method for disengaging the deck clip 107 from edge rail 103. As shown in FIG. 12, engaged deck clip 107 includes and exposed release feature 413 (Step (D)). To initiate the disengagement, an installer applies a force on the release feature 413 to urge the second protrusion 405 out of second channel 503 (Step (E)). Once the second protrusion 405 is disengaged from second channel 503, the deck clip 107 may be moved away from the edge rail 103 (Step (F)).

While the exemplary embodiments illustrated in the figures and described herein are presently preferred, it should be understood that these embodiments are offered by way of example only. Accordingly, the present application is not limited to a particular embodiment, but extends to various modifications that nevertheless fall within the scope of the appended claims. The order or sequence of any processes or method steps may be varied or re-sequenced according to alternative embodiments.

It is important to note that the construction and arrangement of the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the scope of the present application.

The invention claimed is:

1. A method for attaching accessories to a platform member, the method comprising:

providing a platform member having an edge rail having a first channel along a first surface of the edge rail and a second channel along a second surface of the edge rail;

providing a deck clip having a profile including a first protrusion extending from a first portion of the deck clip and a second protrusion extending from a second portion of the deck clip, a spring feature comprising an arcuate portion disposed between the first portion and second portion to provide a flexing or spring-like force to both the first and second protrusions, the first protrusion being arranged and disposed to mate with the first channel of the edge rail and the second protrusion being arranged and disposed to mate with the second channel of the edge rail, the spring feature being arranged and disposed to simultaneously provide a clipping force between the first protrusion and the first channel and the second protrusion and the second channel when engaged; and directing the first protrusion into the first channel and directing the second protrusion into the second channel to detachably engage the deck clip to the platform member.

2. The method of claim 1, wherein the edge rail is fabricated from extruded aluminum.

3. The method of claim 1, wherein the deck clip is fabricated from a polymer.

4. The method of claim 1, further comprising attaching an accessory to the deck clip.

5. The method of claim 4, wherein the accessory is selected from the group consisting of softgoods, hard panel fascia, LED edge lighting, and moving light brackets.

6. The method of claim 1, wherein the directing the second protrusion further includes loading the spring feature during the insertion of the second protrusion into the second channel.

7. The method of claim 1, further comprising withdrawing the second protrusion from the second channel to disengage the deck clip from the edge rail.

8. A deck clip comprising:

a profile including a first protrusion extending from a first portion of the deck clip and a second protrusion extending from a second portion of the deck clip, a spring feature comprising an arcuate portion disposed between the first portion and second portion to provide a flexing or spring-like force to both the first and second protrusions;

wherein the first protrusion is arranged and disposed to mate with a first channel of an edge rail of a staging deck and the second protrusion is arranged and disposed to mate with a second channel of the edge rail of the staging deck, the spring feature being arranged and disposed to simultaneously provide a clipping force between the first protrusion and the first channel and the second protrusion and the second channel when engaged.

9. The deck clip of claim 8, wherein the edge rail is fabricated from extruded aluminum.

10. The deck clip of claim 8, wherein the deck clip is fabricated from a polymer.

11. The deck clip of claim 8, wherein the first portion of the deck clip further includes an attachment structure to detachably engage an accessory to the deck clip.

12. The deck clip of claim 8, wherein the first portion of the deck clip is configured to be attachable to an accessory.

13. The deck clip of claim 12, further comprising the accessory, the accessory being selected from the group consisting of softgoods, hard panel fascia, LED edge lighting, and moving light brackets.

14. A stage system comprising:

a platform member including an edge rail having a first channel along a first surface of the edge rail and a second channel along a second surface of the edge rail; and a deck clip having a profile including a first protrusion extending from a first portion of the deck clip and a second protrusion extending from a second portion of the deck clip, a spring feature comprising an arcuate portion disposed between the first portion and second portion to provide a flexing or spring-like force to both the first and second protrusions;

wherein the first protrusion is arranged and disposed to mate with the first channel and the second protrusion is arranged and disposed to mate with the second channel, the spring feature being arranged and disposed to simultaneously provide a clipping force between the first protrusion and the first channel and the second protrusion and the second channel when engaged.

15. The stage system of claim 14, wherein the edge rail is fabricated from extruded aluminum.

16. The stage system of claim 14, wherein the deck clip is fabricated from a polymer.

17. The stage system of claim 14, wherein the first portion of the deck clip further includes an attachment structure to detachably engage an accessory to the deck clip.

18. The stage system of claim 14, wherein the first portion of the deck clip is configured to be attachable to an accessory.

19. The stage system of claim 18, further comprising the accessory, the accessory being selected from the group consisting of softgoods, hard panel fascia, LED edge lighting, and moving light brackets.

* * * * *